United States Patent [19]
Loewen

[11] Patent Number: 5,373,372
[45] Date of Patent: Dec. 13, 1994

[54] METHOD AND AN APPARATUS FOR LIMITED VARIABLE SPEED SCANNING

[75] Inventor: Victor Loewen, Boise, Id.

[73] Assignee: Hewlett-Packard Company, Palo Alto, Calif.

[21] Appl. No.: 37,061

[22] Filed: Mar. 25, 1993

[51] Int. Cl.[5] ............................................. H04N 1/04
[52] U.S. Cl. ........................................ 358/486; 358/474
[58] Field of Search ............... 358/471, 474, 486, 412, 358/448, 497; H04N 1/04

[56] References Cited

U.S. PATENT DOCUMENTS

| | | | |
|---|---|---|---|
| 4,591,727 | 5/1986 | Gaebelein et al. | 358/486 |
| 5,032,712 | 7/1991 | Ito | 358/486 |
| 5,047,871 | 9/1991 | Meyer et al. | 358/486 |

Primary Examiner—Edward L. Coles, Sr.
Assistant Examiner—Kim Yen Vu

[57] ABSTRACT

This invention is concerned primarily with scanning at multiple vertical resolutions using an essentially single speed scanner (11, 12) without having to use complex digital image processing to do resolution conversions. The invention accomplishes the multiple resolution scanning by a combination of rejecting certain lines of data and making relatively small adjustments to the paper velocity, $V'_p$.

3 Claims, 5 Drawing Sheets

METHOD AND AN APPARATUS FOR LIMITED VARIABLE SPEED SCANNING

BACKGROUND OF THE INVENTION

Technical Field

This invention generally relates to scanning mechanisms for digital imaging scanners, facsimile machines and the like. More particularly, this invention concerns a method and an apparatus for scanning at multiple vertical resolutions, using the same scanning mechanism, with relatively small, or limited, changes in the vertical scanning velocity.

Background

Digital imaging has seen a proliferation of resolution standards. Currently there are three resolution standards which have gained wide acceptance in the industry, which is due mainly to their acceptance in the market place. Resolutions of 204×98 dots per inch (DPI) and 204×196 DPI have become the standards in group 3 facsimile transmission devices while a resolution of 300×300 DPI is the current standard for document printing and desktop publishing. Newer printing technologies should result in higher resolutions such as 600×600 DPI, 900×900 DPI or even 1200×1200 DPI becoming standard.

Unfortunately, as desirable as it may be, it is difficult to design a scanning device which is capable of scanning at all of the various resolutions and to thereby enable the consumer to purchase a single device which will satisfy all scanning needs, e.g. capable of scanning at 204×98 DPI or 204×196 DPI for sending a fax, or at 300×300 DPI or 600×600 DPI for importing graphics into computer generated documents.

To date the solution to the problem has been to scan an image at a given resolution and then "process" the image to convert it to the desired resolution and/or size. Digital image processing, as the phrase is used here, refers to the process of mathematically assigning a value to each pixel of the image representing its tone or greyscale value, and then either averaging groups of pixels to obtain a "super" pixel, or conversely, letting each pixel represent a "super" pixel, which is subsequently translated into a larger group of pixels, depending upon whether the conversion is to either a lower or higher resolution, respectively. Additional processing techniques can be used to refine the image using various algorithms, which are well known.

Unfortunately, even simple digital processing techniques require tremendous amounts of processor time and computing capacity. This constraint has prevented "real time" faxing from high resolution scanners, i.e. where the documents are scanned as the data is being communicated. Instead, all of the pages of a particular transmission are first scanned into the memory of the device, converted to the requisite resolution and stored, prior to transmission. Once this preparation is complete, the processor can focus on the transmission process. The use of a coprocessor to handle the resolution conversion has proven to be both too expensive and complicated.

Another proposed solution, at least to the vertical resolution conversion problem, was to design a mechanism whereby the scanner itself would traverse the paper at variable speeds depending upon the resolution chosen. This would be accomplished by either a variable speed paper advance mechanism, similar to those used in a typical fax machine where the paper moves and the scanner bar remains stationary, or by a variable speed scanner transport mechanism where the paper stays stationary and the scanner bar traverses the paper. This solution would use a stepper motor which could be run at any speed across a range of necessary speeds. In order to accomplish this, the motor would have to be selected for the lowest resolution, since this corresponds to the highest paper velocity or scan bar velocity, hereinafter simply be referred to as paper velocity. To function properly, the mechanism would have to be tuned, at each particular velocity, to prevent unwanted vibration. Due to the expense of the motor, problems of paper drag, mechanism vibration and fundamental frequency harmonics, the design is both too expensive and complex.

What is needed is a method to scan at multiple resolutions which does not require significant processing capability, does not require a complex paper advance or scanner advance mechanism, and which is inexpensive and relatively simple to implement.

SUMMARY OF THE INVENTION

This invention involves scanning, at multiple vertical resolutions, using an essentially single speed scanner without having to use complex digital image processing to do resolution conversions. The invention accomplishes variable resolution scanning by a combination of rejecting certain lines of data and making relatively small adjustments to the paper velocity. The invention can best be understood by analyzing a simple resolution conversion which does not require any scanning speed adjustment and then building upon this analysis.

For the sake of this example, first assume a scanning device that has a design vertical scanning resolution of 300 DPI. Since, for each dot scanned in the vertical direction, an entire line is scanned in the horizontal direction, the vertical resolution can be characterized in terms of lines per inch (LPI). This is so because of the typical scan bar design which uses arrays of photoemitter and detector pairs across the width of a page to gather lines of data at a time. Typical exposure times per line of data run on the order of 2 to 3 milliseconds.

Now assuming a desired vertical resolution of 200 LPI, instead of the design resolution of 300 LPI, simply disregarding one out of every three lines of data will yield the desired resolution, realizing of course that the aspect ratio of new pixels to old pixels in the vertical direction is three to two. Surprisingly, the inventor found that a satisfactory image can be formed by disregarding one out of every three data lines. Similarly, the inventor found that a satisfactory 100 LPI image could be formed by disregarding two out of every three data lines.

However, the conversion ratios usually aren't so convenient. The standard mode vertical resolution for a fax machine is 98 LPI, not 100 LPI, while the fine mode vertical resolution is 196 LPI and not 200 LPI. Instead of conversion ratios of being three to one and three to two, they are 300 to 98 and 300 to 196. A conversion to standard mode fax resolution from 300 LPI, would yield two extra data lines per inch scanned, without making any compensation, throwing out two out of three data lines. However, increasing the paper speed by approximately 2% and throwing out two out of three data lines will yield the desired resolution. Alternatively, disregarding only one out of four data lines and increasing the paper velocity 23% will yield the same resolution as will decreasing the paper speed 53% and disregarding one out of two data lines.

The various combinations for virtually any resolution with in a particular scanner capability can be obtained from the equation $$V_{p\%} = \left(\frac{1}{R_{v\%}}\right)\left(\frac{1}{t}\right)\frac{K_r \, 100^2}{R_{vd} \, V_{pd}}$$

where
- $V'_{p\%}$ = vertical scanner velocity as a percent of design velocity;
- $R_{v\%}$ = vertical resolution as a percent of design resolution;
- $t$ = exposure time per line in seconds;
- $K_r$ = data retention coefficient;
- $V_{pd}$ = design velocity; and
- $R_{vd}$ = design resolution.

While this invention is concerned with scanning at multiple resolutions in the vertical direction, it should be apparent that the principals of the invention can be applied to scanning in the horizontal direction depending upon the particular apparatus, and hence, should not be so limited.

BEST MODE FOR CARRYING OUT INVENTION

Figure 1:
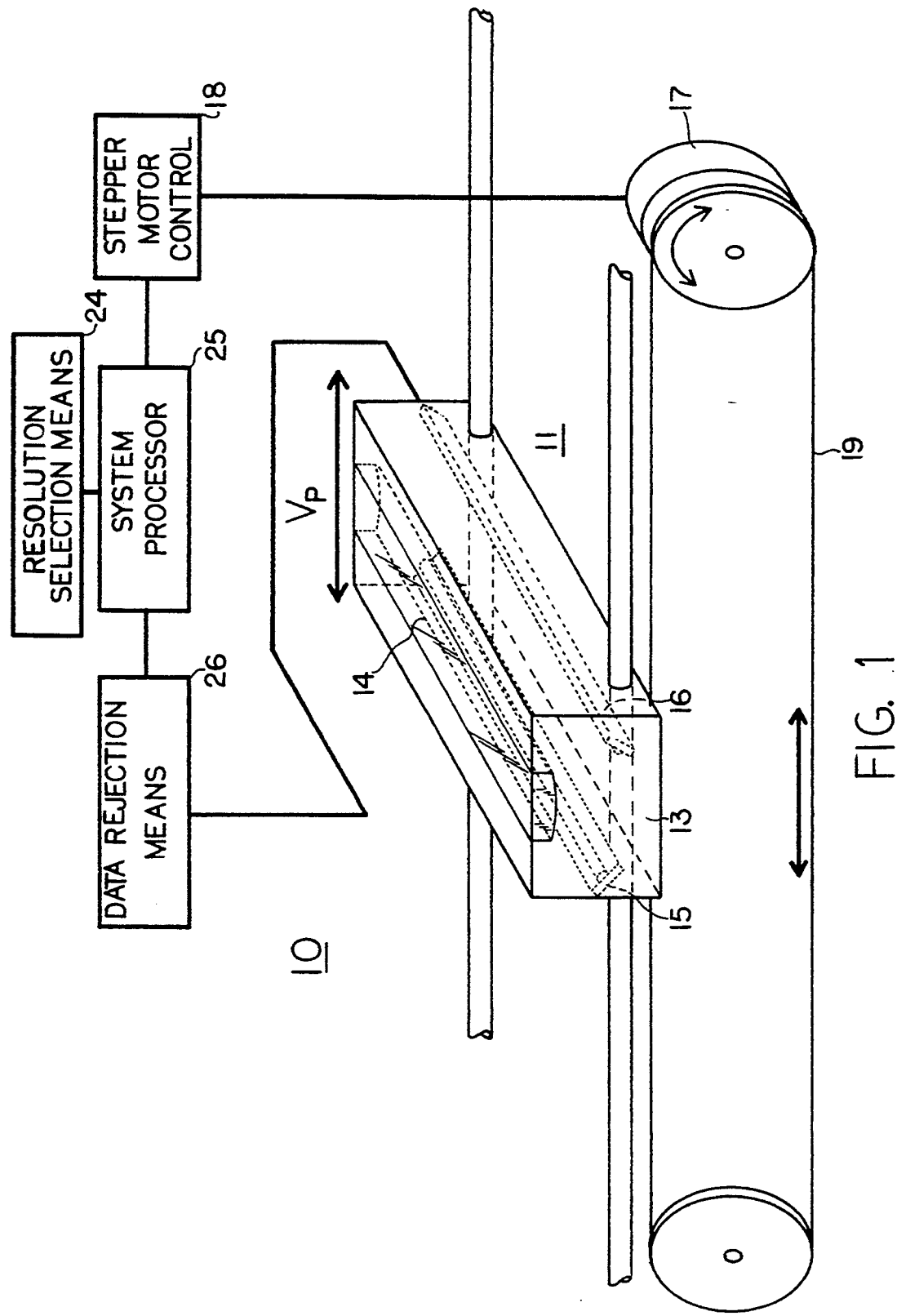
FIG. 1 is a representational schematic of a typical scanning mechanism in a digital scanner, which includes a variable speed motor and a motor controller configured according to my invention.
Figure 2:
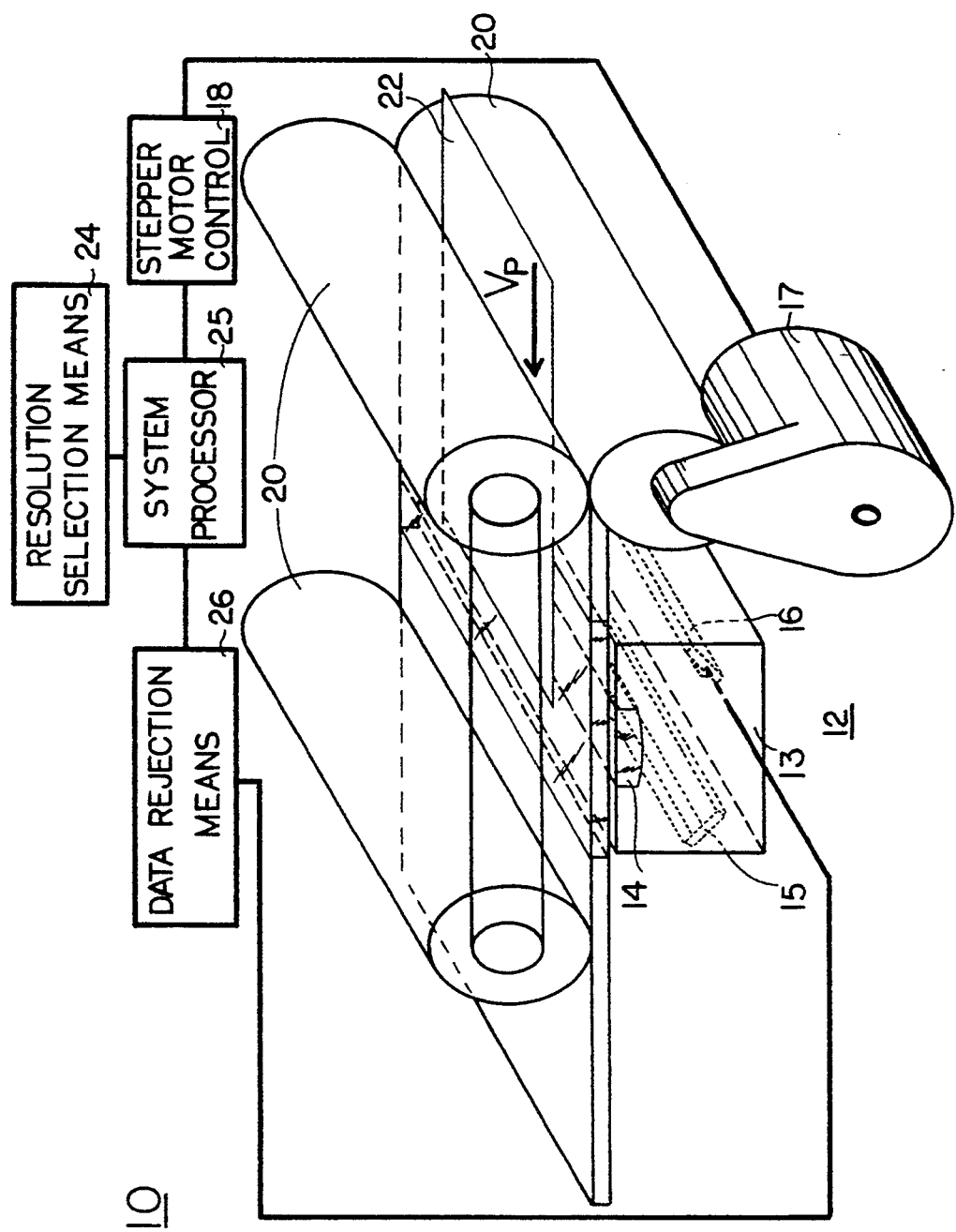
FIG. 2 is a representational schematic of a typical scanning mechanism in a facsimile machine, which includes a variable speed motor and a motor controller configured according to my invention.

Referring now to FIGS. 1 and 2, an apparatus for scanning at multiple vertical resolutions 10 is illustrated in block diagram representational form. FIG. 1 shows the invention implemented on a typical digital scanning device 11, shown in representational format, while FIG. 2 shows the invention implemented on a typical fax machine 12. The primary difference between the two implementations, at least for the purposes of the invention, is that in digital scanning device 11, scanning bar 13 moves and the paper 22 stays stationary, while in the fax machine 12, scanning bar 13 remains stationary and paper 22 moves. In either case, the velocity of the relative motion between scanning bar 13 and paper 22 will be referred to as paper velocity, $V_p$.

In digital scanning device 11, a stepper motor 17 translates scanning bar 13, via a pulley drive system 19, on carriage frame 23. Scanning bar 13 is mounted on a carriage frame 23 so that it can move back and forth under the image to be scanned. In fax machine 12, stepper motor 17 drives paper drive rollers 20 which in turn drag paper 22 across scanning bar 13. It should be noted that these two examples are intended to be for illustrative purposes only and that other configurations of scanners, scanner drives and scanner drive controllers are available and within the scope of applications for this invention.

In both digital scanning device 11 and fax machine 12, scanning bar 13 has a photoemitter array 15 and a photodetector array 16 opposingly positioned beneath lens 14. The light emitted from the photoemitters is refracted through lens 14, reflected off the lighter portions of paper 22 and refracted back through lens 22 to the photodetectors. Each line of data gathered by photodetector array 16 is then sent to the system processor 25, generally a microprocessor, which not only serves to organize the data for storage, transmission or output but also serves to control the various functions of the machine and its components. System processor 25 is also responsible for selecting a data retention coefficient, $K_r$, and the paper velocity, $V_p$, according to the resolution selected, the design velocity, the design resolution and the principals outlined in the following disclosure. A look-up table containing different $K_r$'s, or a similar database, is provided within system processor 25.

A resolution selection means 24 is connected to system processor 25 to enable the user to directly select a resolution for scanning and/or allow a software or hardware interface to select the scanning resolution. Resolution selection means 24 could be implemented any number of ways, including both an input panel on the front of the scanning device and resolution selection inputs on a parallel or serial interface with a personal computer.

A stepper motor control 18 is connected between the system processor 25 and stepper motor 17. Stepper motor control 18 serves to convert a numerical value of the resulting $V_p$ into an electrical signal whose magnitude is directly proportional to the value of the resulting paper velocity.

A data rejection means 26 is also provided and is shown here connected between photodetector array 16 and system processor 25. It should be noted that data rejection means 26 can be implemented in the software of system processor 25 with very little burden imposed, or as a discrete component using programmed gate array logic, for instance. The data rejection means simply rejects lines of data, the number and identification of which are dependent upon the data retention coefficient chosen by system processor 25.

Figure 5:
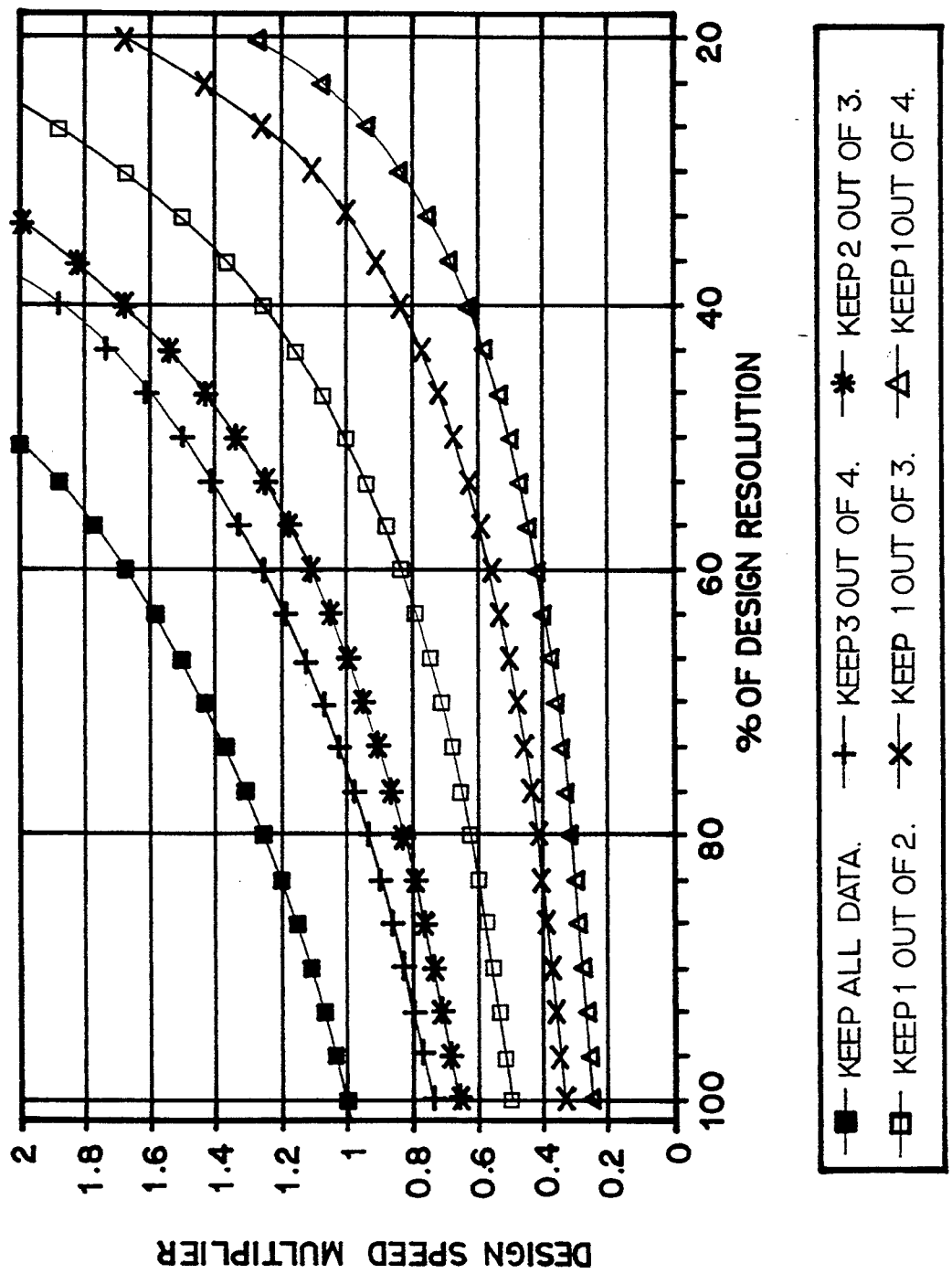
FIG. 5 is graph containing a set of curves generated by Equation 5 using selected data retention coefficients.
Figure 6:
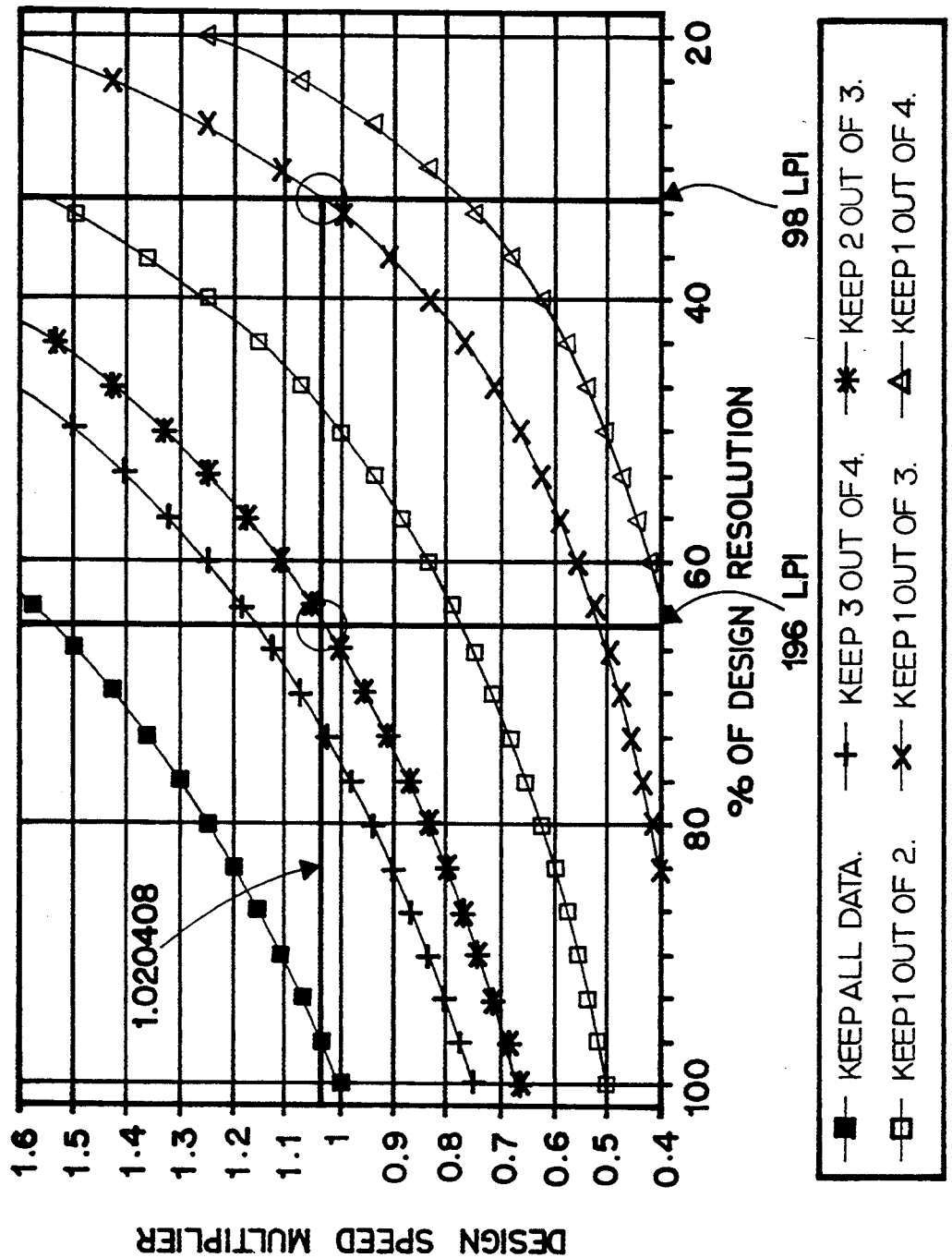
FIG. 6 is a graph containing the same set of curves of FIG. 5 with range restriction of between 40% and 160% of normal.

The relationships between the paper velocity, $V_p$, the data retention coefficient, $K_r$, and the selected vertical resolution, $R_v$, are best understood from the following equations, table and graphs of FIGS. 5 and 6. First, starting with the basic relationship shown in the following equation (1). Now, in order to generate a family of curves for the sake of comparison, introduce an "efficiency" coefficient to the right side of the equation, the data retention coefficient, $K_r$.

$$V_p = \left(\frac{1}{R_v}\right)\left(\frac{1}{t}\right) \tag{1}$$

where
- $V_p$ = vertical scanner velocity relative to the paper in terms of inches per second;
- $R_v$ = vertical resolution in terms of lines per inch (lpi); and t = exposure time per line in seconds.

$$V_p = V_p' K_r \quad (2)$$

$$V_p' = \left(\frac{1}{R_v}\right)\left(\frac{1}{t}\right) K_r$$

where
- $V'_p$ = vertical scanner velocity relative to the paper in terms of inches per second;
- $R_v$ = vertical resolution in terms of lines per inch (lpi);
- t = exposure time per line in seconds; and
- $K_r$ = data retention coefficient.

This coefficient represents the ratio of data lines retained to a particular number of data lines scanned. The following table lists some typical data retention coefficients, which are also the coefficients used to generate the family of curves shown in FIGS. 5 and 6.

TABLE I

| RETAIN | REJECT | COEFFICIENT |
| --- | --- | --- |
| All | None | 1 |
| 3 out of 4 | 1 out of 4 | ¾ or .75 |
| 2 out of 3 | 1 out of 3 | ⅔ or .6667 |
| 1 out of 2 | 1 out of 2 | ½ or .5 |
| 1 out of 3 | 2 out of 3 | ⅓ or .3333 |
| 1 out of 4 | 3 out of 4 | ¼ or .25 |

Next, compare the values obtained to their respective design values by converting the obtained values to a percentage of the corresponding design values. For example, assume a scanner designed to scan at a vertical resolution of 300 LPI which requires a 2 millisecond exposure time per line. From equation (1) the paper velocity is approximately 1.67 inches per second. This is the design paper velocity, $V_{pd}$. But, what percentage would the resulting velocity be of this design velocity for a scan at 196 LPI and a data retention coefficient of ⅔, or maybe ¾? Similarly, for the sake of comparison, would be convenient to express the selected resolution as a percentage of the design resolution. So, first divide the right side of equation (2) by the design paper velocity, $V_{pd}$, and multiply by 100 to yield:

$$V_p\% = \frac{V_p}{V_{pd}} 100 K_r \quad (3)$$

$$V_p\% = \frac{\left(\frac{1}{R_v}\right)\left(\frac{1}{t}\right)}{V_{pd}} 100 K_r$$

where $V_{pd}$ is the design velocity.

Next solve for $R_v$ expressed as a percentage of the design resolution, $R_{vd}$:

$$R_v\% = \frac{R_v}{R_{vd}} 100 \quad (4)$$

$$R_v = R_{vd} R_v\% \frac{1}{100}$$

where $R_{vd}$ is the design resolution.

Now substitute the value $R_v$ obtained from equation (4) into equation (3) and solve for $V'_p$ to yield:

$$V_p\% = \left(\frac{1}{R_v\%}\right)\left(\frac{1}{t}\right)\frac{K_r 100^2}{R_{vd} V_{pd}} \quad (5)$$

where
- $V'_{p\%}$ = vertical scanner velocity as a percent of design velocity; (5)
- $R_{v\%}$ = vertical resolution as a percent of design resolution;
- t = exposure time per line in seconds;
- $K_r$ = data retention coefficient;
- $V_{pd}$ = design velocity; and
- $R_{vd}$ = design resolution.

Now using the various data retention coefficients from Table I and restricting the possible selected vertical resolution domain to 300–50 LPI, as would be typical of a 300 LPI scanner, the set of curves shown in FIG. 5 are generated, Now, restricting the range to between 40% and 160% of normal for the paper velocity yields the curves of FIG. 6.

From FIG. 6 it is easy to graphically choose the best data retention coefficient for a particular resolution. For instance, if it is desired to scan at 98 LPI, which corresponds to approximately 32.67% of the design resolution of 300 LPI, simply proceed down the X-axis until the desired resolution is reached and then proceed upward to see which curves are intersected. The possible paper velocities are indicated at each intersection, expressed as a design speed multiplier. So, for a scan at 98 LPI, one could increase the paper speed by approximately 2% and retain one out of three data lines, decrease the paper speed by approximately 23% and retain one out of four data lines, or increase the paper speed by approximately 53% and retain one out of two data lines. Similarly, for a scan at 196 LPI, which is 65.33% of normal, one could increase the paper speed by approximately 2% and retain two out of three data lines, increase the paper speed by approximately 15% and retain 3 out of 4 data lines, or decrease the paper speed by approximately 23% and retain one out of two data lines.

Figure 3:
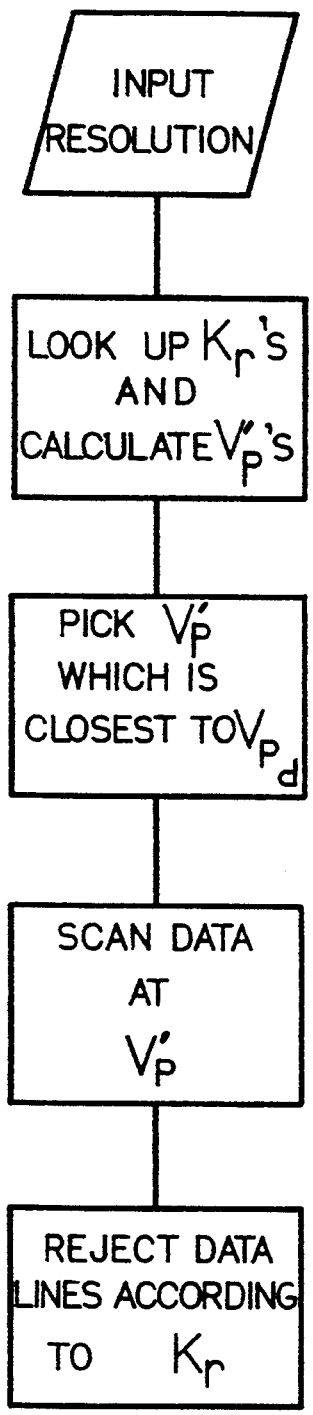
FIG. 3 is a flow diagram illustrating the steps of my invention.
Figure 4:
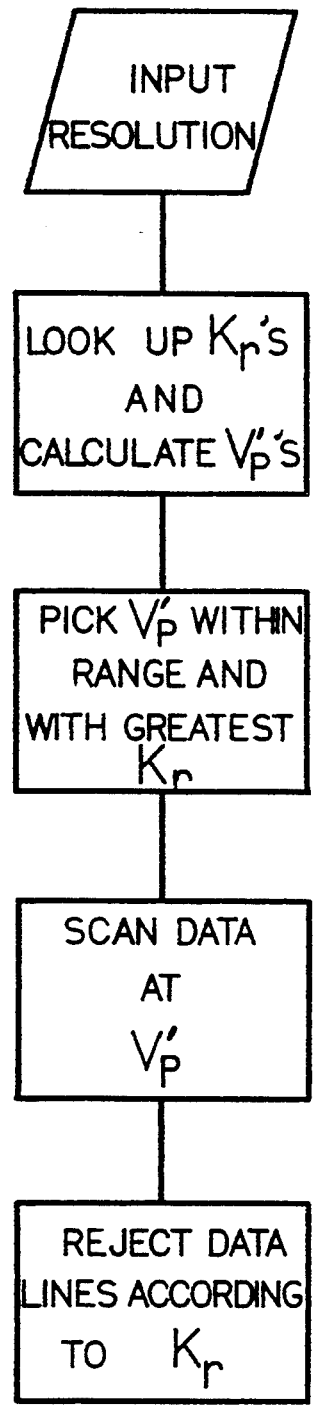
FIG. 4 is a flow diagram illustrating a variation on the basic method of FIG. 3.

Referring now also to FIGS. 3 and 4 the steps for implementing the invention are shown in flow chart form. Since, for a particular machine the design paper velocity, $V_{pd}$, and the design resolution, $R_{vd}$, are known, the first step is to input a desired resolution, $R_v$, via user interaction or an interface with another device such as a personal computer. Next, system processor 25 determines a data retention coefficient, $K_r$, expressed in terms of a fraction, by comparing resulting values of $V_p$ obtained from equation (2) using various data retention coefficients between the values of 0 and 1, such as those in Table I, located in the look-up table, with the design velocity, $V_{pd}$, and selecting the resulting $V'_p$ which is closest to $V_{pd}$. This ensures that the scanning mechanism is running at a speed which is as close to design velocity as possible. Next, system processor 25 communicates the resulting $V'_p$ to stepper motor control 18 which will drive the scanner at the appropriate velocity. As the lines of data are gathered, certain lines are rejected according to the data retention coefficient, $K_r$, where the numerator of the fraction represents the total number of lines retained out the denominator, which represents a particular number of lines scanned.

FIG. 4 illustrates a variation on the basic method which may be more appropriate for relatively low resolution scans. Here, rather than choosing a data retention coefficient which will ensure the resulting paper velocity is as close to design velocity as possible, the method attempts to maximize the data retention coefficient to counteract excess image degradation which might otherwise occur from throwing out large amounts of data. This might be particularly desirable with complex images such as photographs and the like.

While there is shown and described the present preferred embodiment of the invention, it is to be distinctly understood that this invention is not limited thereto but may be variously embodied to practice within the scope of the following claims.

I claim:

1. An apparatus for scanning a page of information at multiple vertical resolutions which comprises:
    line scanning means for scanning successive lines of information at a predetermined design velocity, $V_{pd}$, a predetermined design resolution, $R_{vd}$ and a predetermined exposure time per line, $t$;
    resolution selection means for selecting a desired scanning resolution, $R_v$;
    system processor means, being connected to the resolution selection means and configured for determining a data retention coefficient, $K_r$, expressed in terms of a fraction and determining a new velocity for the line scanning means, the system processor means further being configured to determine the new velocity which is equal to the product of the data retention coefficient, $K_r$, the inverse of the desired scanning resolution, $R_v$, and the inverse of the exposure time, $t$;
    scanning velocity control means, being connected to the line scanning means and the system processor means, for driving the line scanning means at the new velocity; and
    data rejection means being connected to the system processor means and the scanning means for rejecting lines of data according to the data retention coefficient, $K_r$, where the numerator of the fraction represents the total number of lines retained out of the denominator, which represents a particular number of lines scanned.

2. A method for scanning at multiple resolutions using a scanning apparatus having a scanner mechanism, means for generating relative motion between the scanner mechanism and a page containing information, to facilitate scanning successive lines of information at a predetermined design velocity, $V_{pd}$, a predetermined design resolution, $R_{vd}$ and a predetermined exposure time per line, t, comprising the steps of:
    inputting a desired resolution, $R_v$;
    determining a data retention coefficient $K_r$ expressed in terms of a fraction, by comparing resulting values of $V'_p$, obtained from the equation $$V'_p = \left(\frac{1}{R_v}\right)\left(\frac{1}{t}\right)K_r$$

where
    $V'_p$ = vertical scanner velocity relative to the paper in terms of inches per second;
    $R_v$ = vertical resolution in terms of lines per inch (lpi);
    t = exposure time per line in seconds; and
    $K_r$ = data retention coefficient.
        using various data retention coefficients between the values of 0 and 1, with the design velocity $V_{pd}$ and selecting the resulting $V'_p$ which is closest to $V_{pd}$;
    driving the means for generating relative motion at the resulting velocity $V'_p$ while scanning lines of data; and
    rejecting lines of data according to the data retention coefficient, $K_r$, where the numerator of the fraction represents the total number of lines retained out the denominator which represents a particular number of lines scanned.

3. A method for scanning at multiple resolutions using a scanning apparatus having a scanner mechanism, means for generating relative motion between the scanner mechanism and a page containing information, to facilitate scanning successive lines of information at a predetermined design velocity, $V_{pd}$, a predetermined design resolution, $R_{vd}$ and a predetermined exposure time per line, t, comprising the steps of:
    inputting a desired resolution, $R_v$;
    determining a data retention coefficient, $K_r$, expressed in terms of a fraction, by comparing resulting values of $V'_p$, obtained from the equation $$V'_p = \left(\frac{1}{R_v}\right)\left(\frac{1}{t}\right)K_r$$

where
    $V'_p$ = vertical scanner velocity relative to the paper in terms of inches per second;
    $R_v$ = vertical resolution in terms of lines per inch (lpi);
    t = exposure time per line in seconds; and
    $K_r$ = data retention coefficient.
        using various data retention coefficients between the values of 0 and 1 with the design velocity $V_{pd}$ and selecting the resulting $V'_p$ which is both within 60% of $V_{pd}$ and has a corresponding $K_r$ which is greatest of the group of data retention coefficients which satisfy these conditions;
    driving the means for generating relative motion at the resulting velocity $V'_p$ while scanning lines of data; and
    rejecting lines of data according to the data retention coefficient, $K_r$, where the numerator of the fraction represents the total number of lines retained out the denominator which represents a particular number of lines scanned.

* * * * *